(12) United States Patent
Hsu et al.

(10) Patent No.: US 8,014,516 B2
(45) Date of Patent: Sep. 6, 2011

(54) METHOD AND APPARATUS FOR ECHO CANCELLATION

(75) Inventors: Wei-hao Hsu, Kaohsiung (TW); Hsi-Wen Nien, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1216 days.

(21) Appl. No.: 11/609,526

(22) Filed: Dec. 12, 2006

(65) Prior Publication Data

US 2007/0189506 A1 Aug. 16, 2007

Related U.S. Application Data

(60) Provisional application No. 60/762,752, filed on Jan. 27, 2006.

(51) Int. Cl.
*H04M 9/08* (2006.01)
(52) U.S. Cl. .................................. 379/406.01
(58) Field of Classification Search ............. 379/406.01, 379/406.05, 406.06, 406.08, 406.09, 406.1
See application file for complete search history.

(56) References Cited

U.S. PATENT DOCUMENTS

| | | | | |
|---|---|---|---|---|
| 6,163,609 | A | * | 12/2000 | Makinen et al. ......... 379/406.08 |
| 6,766,019 | B1 | | 7/2004 | Benesty et al. |
| 6,792,107 | B2 | | 9/2004 | Tucker et al. |
| 2006/0002547 | A1 | * | 1/2006 | Stokes et al. ............. 379/406.14 |

* cited by examiner

*Primary Examiner* — Simon Sing
*Assistant Examiner* — Simon King
(74) *Attorney, Agent, or Firm* — Thomas|Kayden

(57) ABSTRACT

An exemplary embodiment of an echo cancellation circuit is provided, for use in a voice interaction device simultaneously outputting a remote signal while receiving a local signal. The local signal may comprise an echo generated from the remote signal. A first filter learns the remote signal at a first speed to generate a first coefficient set, and filters the local signal by the first coefficient set to generate a first filter output. A second filter learns the remote signal at a second speed to generate a second coefficient set, and filters the local signal by the second coefficient set to generate a second filter output. A third filter comprises a third coefficient set, canceling the echo from the local signal to generate a third filter output as an echo cancellation result. The controller updates the third coefficient set based on the first, second and third filter outputs.

6 Claims, 4 Drawing Sheets

METHOD AND APPARATUS FOR ECHO CANCELLATION

CROSS REFERENCE TO RELATED APPLICATIONS

This application claims the benefit of U.S. Provisional Application No. 60/762,752, filed Jan. 27, 2006.

BACKGROUND OF THE INVENTION

1. Field of the Invention

The invention relates to voice interaction devices, and in particular, to an echo cancellation method utilizing different filters.

2. Description of the Related Art

FIG. 1 shows a conventional voice interaction device such as mobile phone, comprising a microphone 104 and speaker 102 simultaneously implemented. Remote signal #SRC received remotely, is amplified by the speaker 102 to provide local output #OUT. The microphone 104 receives local signal #MIX including vocal input #IN and environmental noise #ENV. The local output #OUT, however, may also be received by the microphone 104, inducing unwanted echo. Conventionally, an echo canceller 110 cancels the echo in local signal #MIX. The echo canceller 110 may be a FIR filter comprising a coefficient set learned from the remote signal #SRC, with the local signal #MIX filtered by the echo canceller 110 to eliminate the echo therein, generating a destination signal #DST for further transmission.

Vocal communication is typically performed in real time, making the performance of echo canceller 110 critical. The coefficient set in the echo canceller 110 is updated using normalized least mean square (NLMS) algorithm with a predetermined step size. As an example, a larger step size diverges the coefficient set faster, but renders a lower SNR filter result. Conversely, lower step size may render a quality destination signal #DST, but the speed may be insufficient for real-time communication. A tradeoff is thus presented between rapid convergence and fair filtering quality. Additionally, the local output #OUT, vocal input #IN may or may not simultaneously present. When both caller and recipient are talking, double talk is detected, and the performance of echo canceller 110 may decrease, generating noisy destination signal #DST. Thus, an enhanced echo cancellation method is desirable.

BRIEF SUMMARY OF THE INVENTION

A detailed description is given in the following embodiments with reference to the accompanying drawings.

An exemplary embodiment of an echo cancellation circuit is provided, for use in a voice interaction device simultaneously outputting a remote signal while receiving a local signal. The local signal may comprise an echo generated from the remote signal. A first filter learns the remote signal at a first speed to generate a first coefficient set, and filters the local signal by the first coefficient set to generate a first filter output. A second filter learns the remote signal at a second speed to generate a second coefficient set, and filters the local signal by the second coefficient set to generate a second filter output. A third filter comprises a third coefficient set, canceling the echo from the local signal to generate a third filter output as an echo cancellation result. The controller updates the third coefficient set based on the first, second and third filter outputs.

The echo cancellation circuit may further comprise a controller, detecting remote talk, local talk and double talk according to the remote and local signals, and adjusting the second speed based on the detection result.

The controller detects energy levels of the first and second filter outputs. Double talk is detected when both energy levels of the first and second filter outputs exceed a ratio of the energy of local signal. The ratio may be a value between 0 and 1. The first and second speeds are individually determined by a first step size and a second step size. When the controller detects double talk, the controller reduces the second step size. Conversely, when the controller detects no double talk, the controller increases the second step size. The second step size does not exceed the first step size.

The controller detects remote talk if the energy of remote signal exceeds a remote threshold, and local talk if the energy of local signal exceeds a local threshold. When no double talk is detected, the controller further sets the second step size by the following condition. If both remote talk and local talk exist, the controller sets the second step size to a first value lower than the first step size. If only remote talk exists, the controller sets the second step size to a second value lower than the first value. If only local talk exists, the controller sets the second step size to a third value lower than or equal to the second value.

The first filter is a shadow filter, and the second filter is an adaptive filter. The controller determines whether to update the third coefficient set according to energy levels of the first, second and third filter outputs, referred to as a first, a second, and a third energy. If the first energy is lower than a first ratio of the third energy, and lower than the second energy, the controller copies the first coefficient set to the third coefficient set. If the second energy is lower than a second ratio of the third energy, and lower than the first energy, the controller copies the second coefficient set to the third coefficient set. Otherwise, the third coefficient set remains as is. The first and second ratios may be values between 0 and 1.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
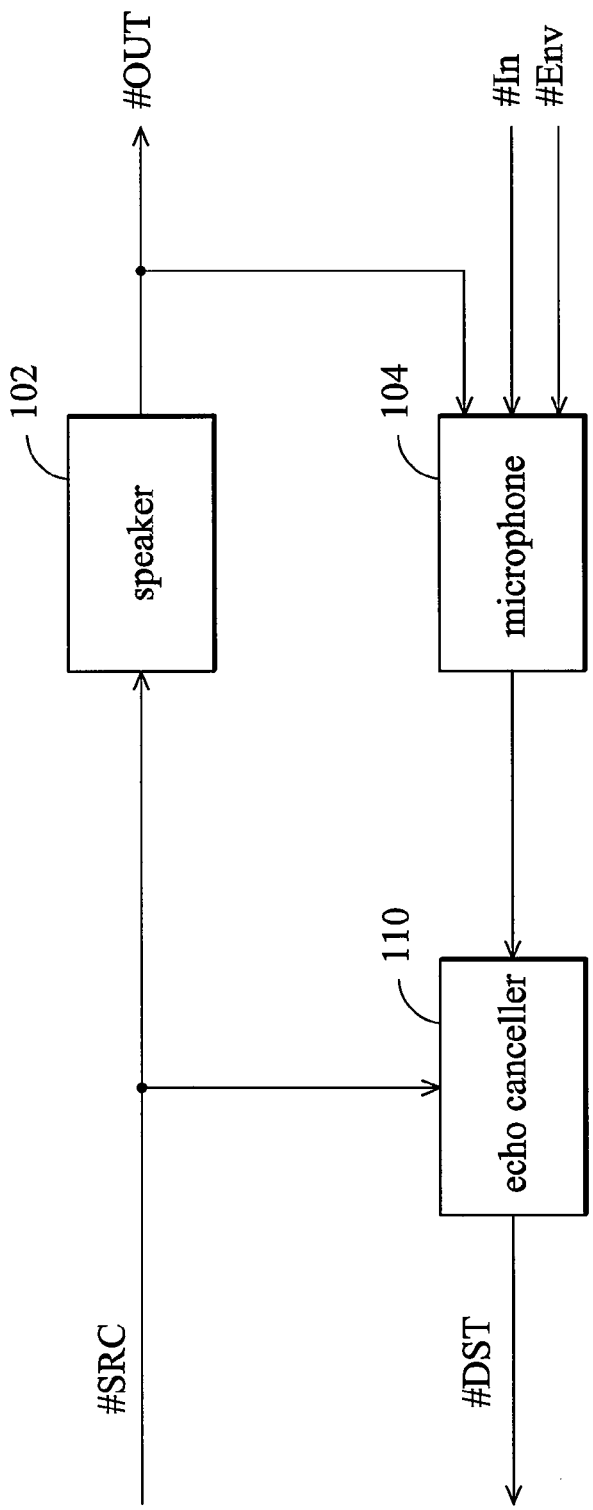
FIG. 1 shows a conventional voice interaction device.
Figure 2:
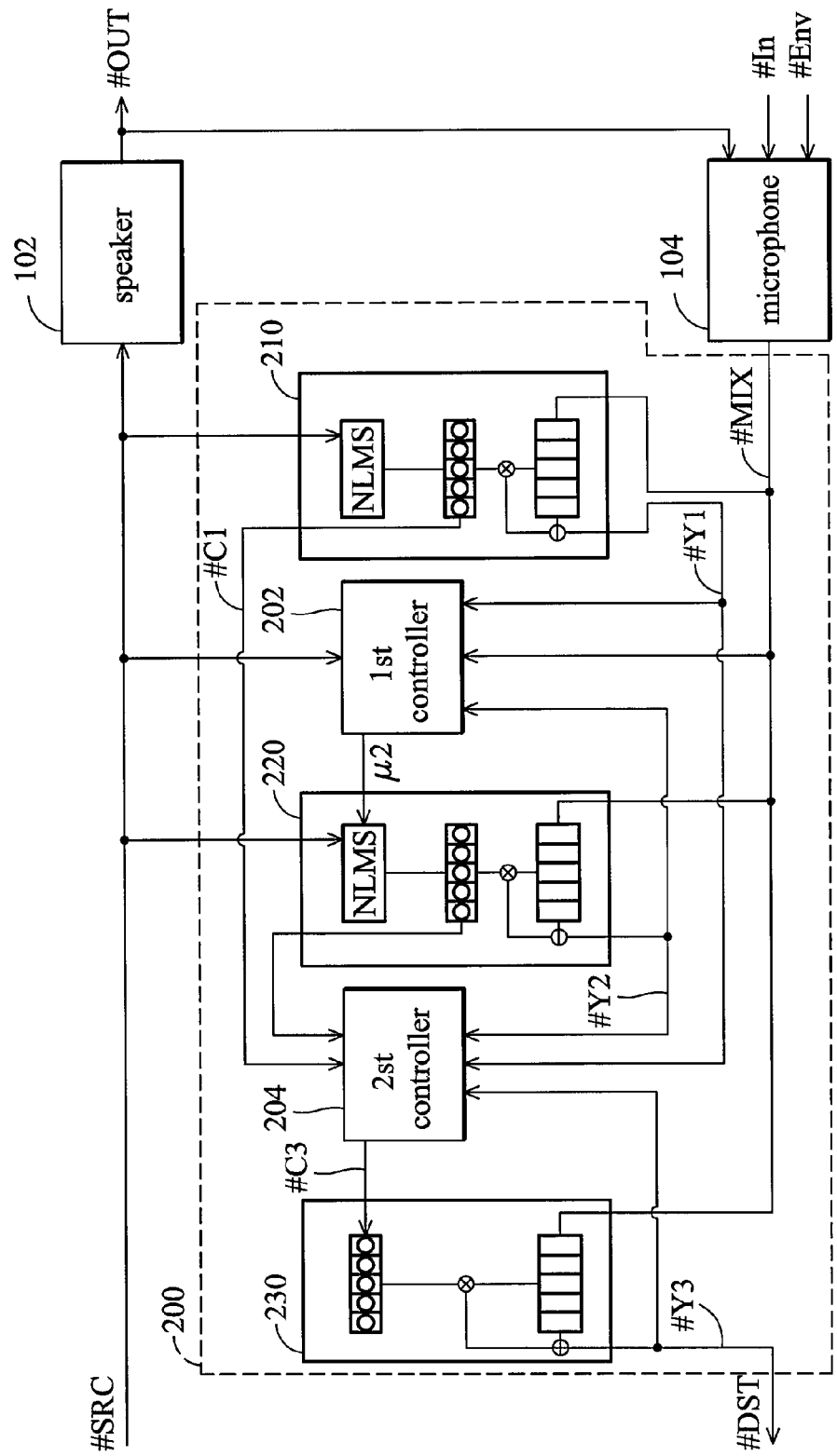
FIG. 2 shows an embodiment of an echo cancellation circuit.

FIG. 2 shows an embodiment of an echo cancellation circuit 200, comprising three filters, a first filter 210, a second filter 220 and a third filter 230. The first filter 210 and second filter 220 are "trial units" generating preliminary results, and the third filter 230 determines the final result based on analysis of the preliminary results. The first filter 210 is designed to have a large step size and fewer taps, and the second filter 220 has a lesser, adjustable step size with more taps. The first filter 210 rapidly reflects echo variation, and the second filter 220 provides better filter quality, such that the embodiment can take advantage of the combination of first and second filters 210 and 220. Based on NLMS algorithm with their step sizes, the first filter 210 and second filter 220 are trained by the remote signal #SRC to individually generate a first coefficient set #C1 and a second coefficient set #C2, and the local signal #MIX is correspondingly filtered thereby to generate two filter outputs, first filter output #Y1 and second filter output #Y2. The third filter 230 uses third coefficient set #C3 to generate a third filter output #Y3 as the destination signal #DST, where the third coefficient set #C3 is dynamically adjustable based on the first filter output #Y1 and second filter output #Y2. The determination of third coefficient set #C3 will be described later.

A normalized least mean square algorithm can be expressed as:

$$c(i) = c(i-1) + \mu(i)\frac{e(i)}{|x(i)|^2}x(i)$$

Where c(i) denotes a current coefficient updated from the previous coefficient c(i−1), μ is the step size, e(i) is a residual error term estimated elsewhere, and x(i) is the input signal to be learned. The step size of first filter 210, first step size $\mu_1$, may be a fixed large value to provide rapid convergency, and the step size in second filter 220, second step size $\mu_2$, configured to be less than the first step size $\mu_1$, is adjustable based on the first filter output #Y1 and second filter output #Y2. Thus, the filter is flexible for various conditions. For example, the second step size $\mu_2$ may vary with different conditions such as remote talk, local talk, or double talk.

In echo cancellation circuit 200, a first controller 202 is provided, detecting remote talk, local talk and double talk according to the remote signal #SRC, the local signal #MIX, the first filter output #Y1, and the second filter output #Y2. The echo cancellation circuit 200 is coupled to the second filter 220, adjusting the second step size $\mu_2$ based on the detection result. First, the first controller 202 estimates energy levels of the first filter output #Y1 and second filter output #Y2. The energy level may be an averaged result derived from a running average algorithm:

$$E_{av}(i) = \epsilon \cdot E_{av}(i-1) + (1-\epsilon) \cdot E(i)$$

where $E_{av}(i-1)$ is the previous value of a signal, E(i) is the currently estimated energy value, and $E_{av}(i)$ is the current averaged result. The ratio ε is a value between 0 and 1.

Double talk means both remote and local signals occur simultaneously such that the local output #OUT and vocal input #IN carry significant energies therewith. The first filter 210 or second filter 220 may effectively cancel the echo in the local signal #MIX, however, the corresponding first filter output #Y1 and second filter output #Y2 still possess the energy from the vocal input #IN. Thus, the energy levels of first filter output #Y1 and second filter output #Y2 are checked. If both energy levels of the first filter output #Y1 and second filter output #Y2 exceed a ratio of the energy of local signal #MIX, double talk is deemed positive. The second step size $\mu_2$ can then be adjusted to render a better filter result for double talk. When the first controller 202 detects double talk, the second step size $\mu_2$ is reduced to a minimum value, $\beta_4$. Conversely, if no double talk is detected, the first controller 202 increases the second step size $\mu_2$ to a value not exceeding the first step size $\mu_1$.

Additionally, remote talk and local talk are detected by the first controller 202. Remote talk means the energy of remote signal exceeds a remote threshold. Local talk means the energy of local signal exceeds a local threshold. When no double talk is detected, the second step size $\mu_2$ is further determined based on the remote talk and local talk conditions:

$$\epsilon\ VAD(R)=1\ \&\ VAD(L)=1, \mu_2=\beta_1$$

$$\epsilon\ VAD(R)=1\ \&\ VAD(L)=0, \mu_2=\beta_2$$

$$\epsilon\ VAD(R)=0\ \&\ VAD(L)=1, \mu_2=\beta_3$$

where VAD(R) and VAD(L) indicate positivities of the remote and local talk conditions, and the relationships of 0 are:

$$\beta_4 < \beta_3 \leq \beta_2 < \beta_1$$

Note these values do not exceed the first step size $\mu_1$ in the embodiment. As an example, if the first filter 210 is a shadow filter, and the second filter 220 is an adaptive filter, both are therefore operative to generate preliminary filter outputs, and thereafter, the third filter 230 filters the local signal #MIX by a third coefficient set #C3 estimated from the preliminary filter outputs.

In the echo cancellation circuit 200, a second controller 204 is provided to determine the third coefficient set #C3. Energy levels of the first filter output #Y1, second filter output #Y2 and third filter output #Y3 are compared in the second controller 204. Among the first filter output #Y1, second filter output #Y2 and third filter output #Y3, a best result is chosen to decide the third coefficient set #C3. The best result is deemed to be a filter output having the minimum energy level. Initially, third coefficient set #C3 may be a copy of the second coefficient set #C2 or third coefficient set #C3, and remains constant while rendering the third filter output #Y3. When a better filter output is found among the first filter 210 or second filter 220, the third coefficient set #C3 is updated to the corresponding first coefficient set #C1 or second coefficient set #C2. The rules can be expressed as:

$$\epsilon\ E_{Y1} < \alpha_1 \cdot E_{Y3}\ \&\ E_{Y1} < E_{Y2}, \#C3 = \#C1$$

$$\epsilon\ E_{Y2} < \alpha_2 \cdot E_{Y3}\ \&\ E_{Y2} < E_{Y3}, \#C3 = \#C2$$

where EY1, EY2 and EY3 denote energy levels of the first filter output #Y1, second filter output #Y2 and third filter output #Y3 respectively, and $\alpha_1$ and $\alpha_2$ are factors between 0 and 1. If neither of the two conditions are met, the third coefficient set #C3 is not updated, retaining its previous value. In this way, the destination signal #DST is always the most optimized filter result among the first filter 210, second filter 220 and third filter 230, and no matter how the local output #OUT and vocal input #IN vary, the echo cancellation quality remains stable.

Figure 3:
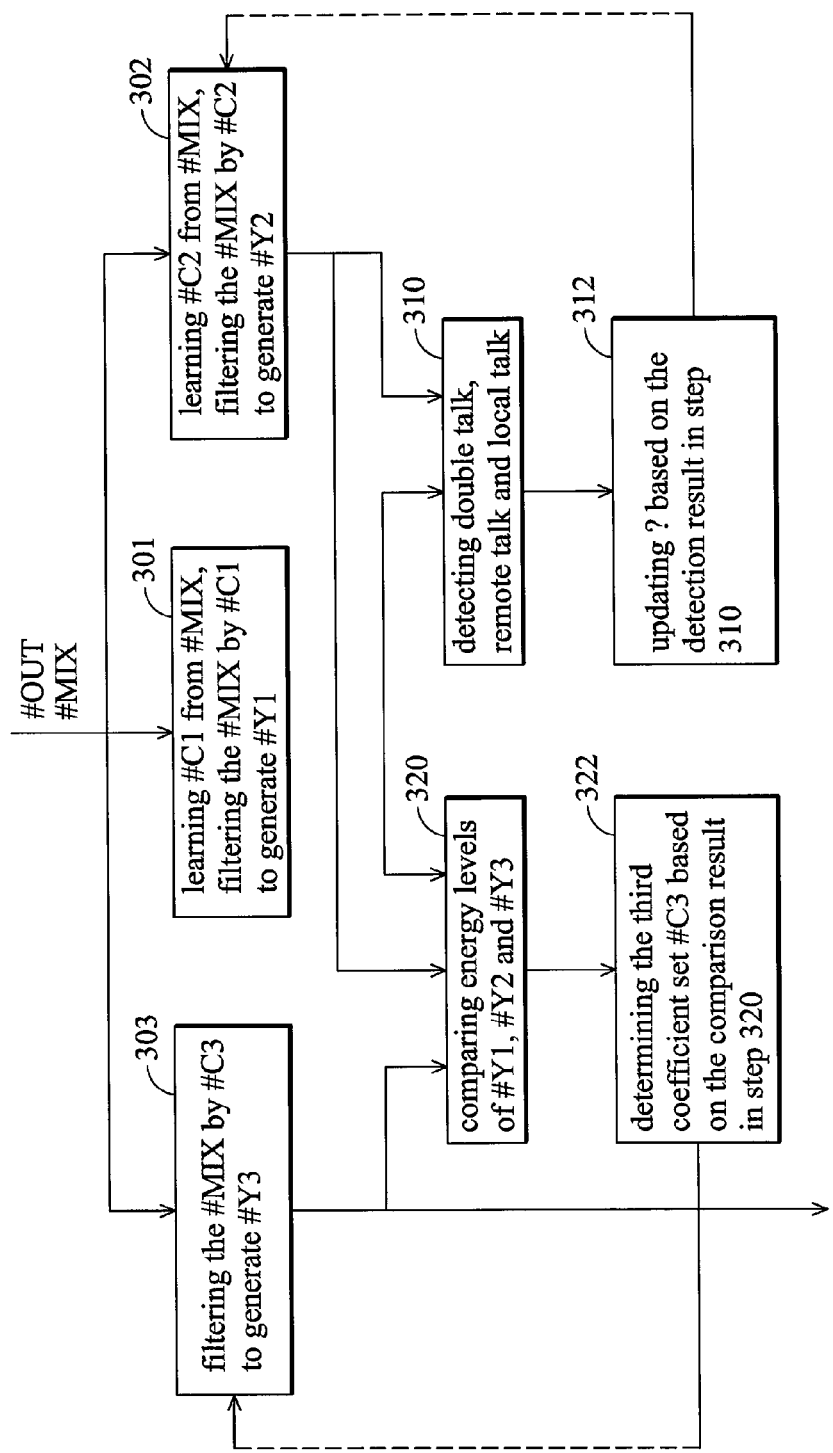
FIG. 3 is a flowchart of an embodiment of an echo cancellation method.

FIG. 3 is a flowchart of the embodiment of echo cancellation method. In steps 301, 302 and 303, the local output #OUT in FIG. 2 is input and learned, and first filter output #Y1, second filter output #Y2 and third filter output #Y3 are generated with corresponding first coefficient set #C1, second coefficient set #C2 and third coefficient set #C3. In step 310, talking conditions are detected, such as double talk, remote talk or local talk. In step 312, the second step size $\mu_2$ is updated according to the detection result in step 310. The second step size $\mu_2$ affects the learning speed of step 302. Simultaneously, energy levels of the first filter output #Y1, second filter output #Y2 and third filter output #Y3 are compared in the step 320. In step 322, the comparison result is used to determine the third coefficient set #C3. The third coefficient set #C3 is used in step 303 to generate the third filter output #Y3 as an echo cancellation result.

Figure 4:
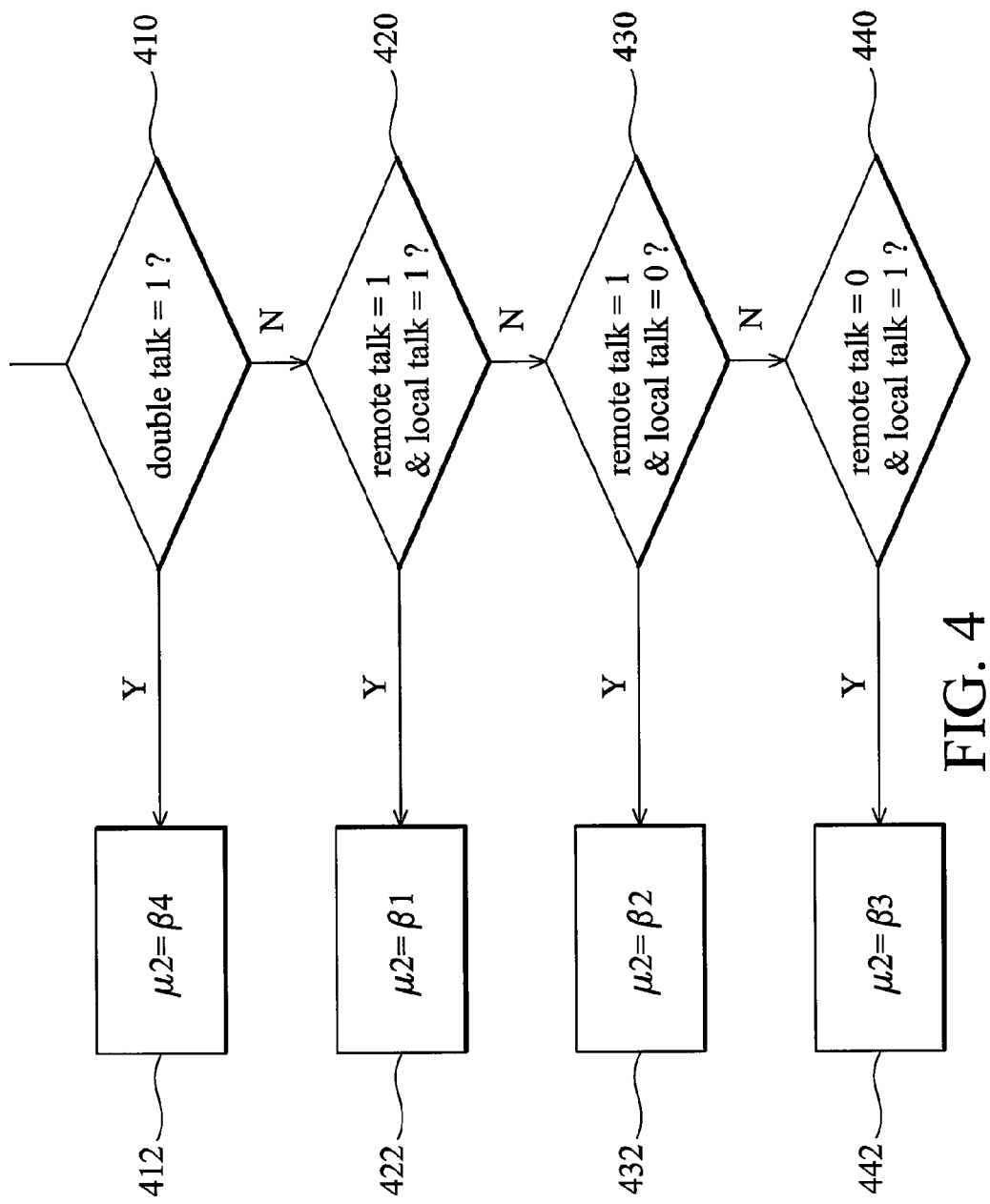
FIG. 4 is a flowchart of a coefficient determination.

FIG. 4 is a flowchart of coefficient determination. In step 410, double talk positivity is detected. If so, step 412 is processed, the second step size $\mu_2$ is set to $\beta_4$. Otherwise, step 420 detects whether remote talk and local talk both exist. If so, step 422 is executed, setting the second step size $\mu_2$ to $\beta_1$, and if not, step 430 is processed, checking if only remote talk exists. If only remote talk happens, second step size $\mu_2$ is set to $\beta_2$ in step 432. Step 440 checks whether local talk exists while remote talk is absent. yes to step 442, setting the second step size $\mu_2$ to $\beta_3$. In the embodiment, the values are related as $\beta_4 < \beta_3 \leq \beta_2 < \beta_1$.

The embodiment can be applied in a mobile phone, or any device simultaneously comprising a microphone and a speaker. The first controller 202 and second controller 204 can be logic units implemented by circuits or software programs. The first filter 210, second filter 220 and third filter 230 can also be algorithms implemented by a DSP cooperating with memory devices. As an example, if the embodiment is a VOIP application, the echo cancellation circuit 200 can be a software module installed in the embedded systems such as Linux.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An echo cancellation circuit for a voice interaction device simultaneously outputting a remote signal while receiving a local signal, wherein the local signal comprises an echo generated from the remote signal, the echo cancellation circuit comprising:
   a first filter, learning the remote signal at a first speed to generate a first coefficient set, and the first coefficient set filtering the local signal to generate a first filter output;
   a second filter, learning the remote signal at a second speed to generate a second coefficient set, and the second coefficient set filtering the local signal to generate a second filter output; and
   a third filter, comprising a third coefficient set, canceling the echo from the local signal to generate a third filter output as an echo cancellation result; wherein a controller updates the third coefficient set based on the first, second and third filter outputs; wherein
   the controller detects remote talk, local talk and double talk according to the remote and local signals, and adjusts the second speed based on the detection result;
   the first and second speeds are individually determined by a first step size and a second step size;
   when the controller detects double talk, the controller reduces the second step size;
   when the controller detects no double talk, the controller increases the second step size; wherein the second step size does not exceed the first step size;
   the controller detects remote talk if the energy of remote signal exceeds a remote threshold;
   the controller detects local talk if the energy of local signal exceeds a local threshold;
   when no double talk is detected, the controller further sets the second step size by the following condition:
   if both remote talk and local talk exist, the controller sets the second step size to a first value lower than the first step size;
   if only remote talk exists, the controller sets the second step size to a second value lower than the first value; and
   if only local talk exists, the controller sets the second step size to a third value lower than or equal to the second value.

2. An echo cancellation circuit for a voice interaction device simultaneously outputting a remote signal while receiving a local signal, wherein the local signal comprises an echo generated from the remote signal, the echo cancellation circuit comprising:
   a first filter, learning the remote signal at a first speed to generate a first coefficient set, and the first coefficient set filtering the local signal to generate a first filter output;
   a second filter, learning the remote signal at a second speed to generate a second coefficient set, and the second coefficient set filtering the local signal to generate a second filter output; and
   a third filter, comprising a third coefficient set, canceling the echo from the local signal to generate a third filter output as an echo cancellation result; wherein a controller updates the third coefficient set based on the first, second and third filter outputs; wherein
   the controller detects remote talk, local talk and double talk according to the remote and local signals, and adjusts the second speed based on the detection result;
   the first and second speeds are individually determined by a first step size and a second step size;
   when the controller detects double talk, the controller reduces the second step size;
   when the controller detects no double talk, the controller increases the second step size; wherein the second step size does not exceed the first step size;
   the controller detects remote talk if the energy of remote signal exceeds a remote threshold;
   the controller detects local talk if the energy of local signal exceeds a local threshold;
   when no double talk is detected, the controller further sets the second step size by the following condition:
   if both remote talk and local talk exist, the controller sets the second step size to a first value lower than the first step size;
   if only remote talk exists, the controller sets the second step size to a second value lower than the first value;
   if only local talk exists, the controller sets the second step size to a third value lower than or equal to the second value;
   the first filter is a shadow filter recursively updating the first coefficient set based on a normalized least mean square (NLMS) algorithm; and
   the second filter is an adaptive filter recursively updating the second coefficient set based on the NLMS algorithm.

3. An echo cancellation circuit for a voice interaction device simultaneously outputting a remote signal while receiving a local signal, wherein the local signal comprises an echo generated from the remote signal, the echo cancellation circuit comprising:
   a first filter, learning the remote signal at a first speed to generate a first coefficient set, and the first coefficient set filtering the local signal to generate a first filter output;
   a second filter, learning the remote signal at a second speed to generate a second coefficient set, and the second coefficient set filtering the local signal to generate a second filter output; and
   a third filter, comprising a third coefficient set, canceling the echo from the local signal to generate a third filter output as an echo cancellation result; wherein a controller updates the third coefficient set based on the first, second and third filter outputs; wherein the controller detects remote talk, local talk and double talk according to the remote and local signals, and adjusts the second speed based on the detection result;

the controller determines whether to update the third coefficient set according to energy levels of the first, second and third filter outputs, referred to as a first, a second, and a third energy;

if the first energy is lower than a first ratio of the third energy, and lower than the second energy, the controller copies the first coefficient set to the third coefficient set;

if the second energy is lower than a second ratio of the third energy, and lower than the first energy, the controller copies the second coefficient set to the third coefficient set;

otherwise the third coefficient set remains as is; and the first and second ratios are values between 0 and 1.

4. An echo cancellation method, for a voice interaction device simultaneously outputting a remote signal while receiving a local signal, wherein the local signal comprises an echo generated from the remote signal, the echo cancellation method comprising:

learning the remote signal at a first speed to generate a first coefficient set;

filtering the local signal by the first coefficient set to generate a first filter output;

learning the remote signal at a second speed to generate a second coefficient set;

filtering the local signal by the second coefficient set to generate a second filter output;

providing a third coefficient set to cancel the echo from the local signal to generate a third filter output as an echo cancelled result, wherein the third coefficient set is selectively a copy of the first or second coefficient set decided by comparison of the first, second and third filter outputs;

detecting remote talk, local talk and double talk according to the remote and local signals, and adjusting the second speed based on the detection result;

wherein the first and second learning speeds are individually determined by a first step size and a second step size; and the echo cancellation method further comprising:

when double talk is detected, reducing the second step size; when no double talk is detected, increasing the second step size;

wherein the second step size does not exceed the first step size;

detecting remote talk if the energy of remote signal exceeds a remote threshold;

detecting local talk if the energy of local signal exceeds a local threshold; and when no double talk is detected, setting the second step size by:

if both the remote talk and local talk exist, setting the second step size to a first value lower than the first step size;

if only the remote talk exists, setting the second step size to a second value lower than the first value; and if only the local talk exists, setting the second step size to a third value lower than or equal to the second value.

5. The echo cancellation method as claimed in claim 4, further comprising recursively updating the first and second coefficient sets based on a normalized least mean square (NLMS) algorithm.

6. An echo cancellation method, for a voice interaction device simultaneously outputting a remote signal while receiving a local signal, wherein the local signal comprises an echo generated from the remote signal, the echo cancellation method comprising:

learning the remote signal at a first speed to generate a first coefficient set;

filtering the local signal by the first coefficient set to generate a first filter output;

learning the remote signal at a second speed to generate a second coefficient set;

filtering the local signal by the second coefficient set to generate a second filter output;

providing a third coefficient set to cancel the echo from the local signal to generate a third filter output as an echo cancelled result, wherein the third coefficient set is selectively a copy of the first or second coefficient set decided by comparison of the first, second and third filter outputs;

determining whether to update the third coefficient set according to energy levels of the first, second and third filter outputs, referred to as a first, a second, and a third energy;

if the first energy is lower than a first ratio of the third energy, and lower than the second energy, copying the first coefficient set to the third coefficient set;

if the second energy is lower than a second ratio of the third energy, and lower than the first energy, copying the second coefficient set to the third coefficient set; and otherwise leaving the third coefficient set as is; wherein the first and second ratios are values between 0 and 1.

* * * * *